United States Patent [19]

Knox et al.

[11] 4,263,268

[45] Apr. 21, 1981

[54] PREPARATION OF POROUS CARBON

[75] Inventors: John H. Knox, Edinburgh; Mary T. Gilbert, Musselburgh, both of Scotland

[73] Assignee: Shandon Southern Products Limited, Runcorn, England

[21] Appl. No.: 96,236

[22] Filed: Nov. 20, 1979

[30] Foreign Application Priority Data

Nov. 21, 1978 [GB] United Kingdom ............... 45397/78

[51] Int. Cl.³ ............................................ C01B 31/02
[52] U.S. Cl. .................................. 423/449; 252/421; 252/422; 252/444; 264/29.1; 423/445; 423/448
[58] Field of Search ................. 423/449, 445, 448; 264/29.1; 252/421, 422, 424, 444, 446

[56] References Cited

U.S. PATENT DOCUMENTS

| | | | |
|---|---|---|---|
| 1,867,435 | 7/1932 | Adair | 252/424 |
| 3,111,396 | 11/1963 | Ball | 423/449 UX |
| 3,446,593 | 5/1969 | Moutaud | 423/449 X |
| 3,574,548 | 4/1971 | Sands et al. | 423/449 |
| 3,666,526 | 5/1972 | Ettinger et al. | 423/449 UX |
| 4,206,078 | 6/1980 | Ohorodnik et al. | 252/446 X |

FOREIGN PATENT DOCUMENTS

1118651  7/1968  United Kingdom ..................... 252/422

OTHER PUBLICATIONS

Colin et al., "J. of Chromotography" 126 (1976) pp. 43–62.

*Primary Examiner*—Edward J. Meros
*Attorney, Agent, or Firm*—Kurt Kelman

[57] ABSTRACT

Porous carbon, suitable for instance for chromatography and as a catalyst support is formed by depositing carbon into the pores of a porous inorganic template such as silica gel, porous glass or a porous oxide, e.g. alumina, and thereafter removing the template as by dissolution or evaporation. Carbon is preferably deposited as a polymerizable organic material that is polymerized in situ in the template pores and then pyrolyzed to carbon.

17 Claims, 2 Drawing Figures

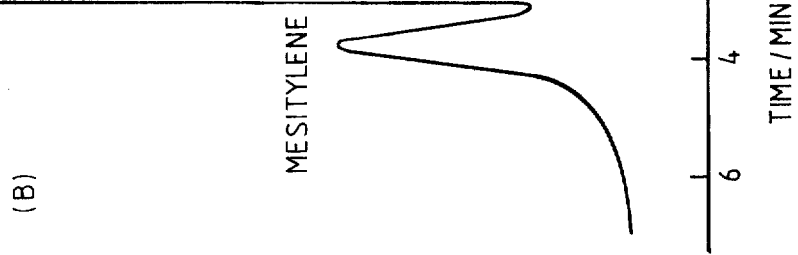
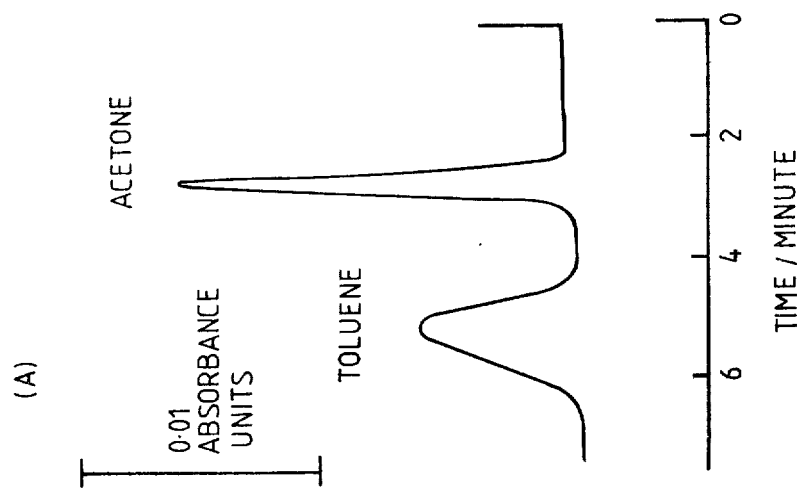
Fig. 2.

PREPARATION OF POROUS CARBON

BACKGROUND TO THE INVENTION AND THE PRIOR ART

Carbon formed by pyrolysis of bone, wood, coal, sugar and other biological or organic materials and having an extended surface has long been known as a potent adsorbent. However, such carbon possesses undesirable properties for chromatography, giving poor symmetry of chromatographic peaks and slow mass transfer. These undesirable features arise from the presence of an uncontrolled variety of functional groups on the surface of the carbon, from the presence of impurities and from the presence of pores of a wide range of sizes including pores of very small diameter.

Three methods have recently been proposed for the production of porous carbon or equivalent material with improved chromatographic properties:

(A) Aggregates made from colloidal carbon blacks are given structural strength by deposition of pyrolytic carbon thereon. In this proposal the aggregates of carbon black are heated to a high temperature (typically 900° C.) in a stream of inert gas (typically nitrogen) containing a pyrolysable organic vapour (typically benzene at, say, 20% mole fraction). The materials so formed have surface areas of 100 to 400 $m^2g^{-1}$ and show good chromatographic properties, in particular reduced plate heights of less than 3 under optimum conditions of flow rate. However, the production of the aggregates is tedious and until hardened by deposition of pyrolytic carbon they are extremely fragile. This proposed method therefore does not appear to be suitable for large scale production.

(B) Silica gels with good pore structure are submitted to a treatment, such as that described in (A) above for carbon black aggregates, to produce a silica gel the internal surface of which is covered by a layer of pyrolytic carbon. This product gives a good chromatographic performance but the presence of a silica core is a disadvantage in that eluents aggressive to silica cannot be used: furthermore it is difficult to attain complete coverage of the silica surface by carbon because the carbon tends to deposit on surface nuclei already present rather than on the bare silica.

(C) A natural carbon formed, say, by pyrolysis of coal is treated with strong chemical reagents to remove most impurities and then heated to about 3000° C. whereupon evaporation of the remaining impurities, and graphitization, occurs. Although the material before graphitization may have a surface area in the range 50 to 100 $m^2g^-$, this is reduced to 5 to 10 $m^2g^{-1}$ after graphitization. The chromatographic performance of this product to date has proved disappointing.

There thus remains a need for a method which will produce a porous carbon product of uniform surface properties, which has a good pore structure, uniform pore sizes and adequate mechanical strength. The present invention seeks to provide such a method which is distinguished from any of the above-described prior art methods.

SUMMARY OF THE INVENTION

The invention provides a method of producing porous carbon by depositing carbon in the pores of a porous inorganic template material having a surface area of at least 1 $m^2g^{-1}$, and thereafter removing the template material. Suitable template materials are silica gel, porous glass, alumina or other porous refractory oxides. Desirably the mean pore size of the template material is in the range 3 to 2000 nm, and the template material has a porosity of at least 40%.

The deposit of carbon may conveniently be formed directly in situ in the pores of the template material, polymerizable organic material that enters the pores of the template material, is polymerized within the pores, and is thereafter decomposed to deposit carbon in the pores. Polymerization may be effected by heating and/or by the addition of an initiator or catalyst.

The polymerizable organic material can be introduced into the pores of the template material as a liquid whose molecules are sufficiently small to penetrate the pores of the template material, or the polymerizable material can be deposited in the pores from a solution, by evaporation of the solvent thereof.

Alternatively organic material may be introduced as a vapour, which by reaction deposits a polymer (or indeed even carbon itself) within the pores of the template material.

The composite organic/inorganic structure formed from the template and organic materials can be heated in an inert atmosphere to such a temperature (preferably in the range 600°–1100° C.) that decomposition of the organic material takes place to form carbon in the pore structure of the template material. The carbon so formed will normally be of the amorphous type known as "glassy carbon" which is known to have great structural strength and elasticity.

Subsequent to the formation of carbon within the pores of the template material, the inorganic template material is removed from the composite structure, suitably by solution in suitable chemical reagents (for example sodium hydroxide or hydrofluoric acid if the template material is silica) or by evaporation (for example by heating to a temperature above 1600° C. if the template material is silica) in inert gas or in vacuo.

The porous carbon product of the method of the invention has a pore structure which is the inverse of that of the template material. Its pore dimensions and surface area will be similar to those of the template material, and the external dimensions of the particles of the porous carbon product will be similar to those of the template material.

Because the porous carbon product of the method of the invention may contain micropores, it will be desirable in many cases to modify the structure of the carbon product by after-treatment. Examples of such after-treatment are (A) the deposition of a layer of pyrocarbon on the internal surface of the porous carbon by passing an inert gas containing a pyrolysable organic substance over the carbon product at a temperature of 900° C., and/or (B) heating the porous carbon product in an inert atmosphere to a temperature between 1600° and 3000° C. in order to bring about surface reorganization or graphitization of the carbon.

Porous carbon formed by the method of the invention can be prepared with uniform pore size distribution, with few if any impurities, and with a uniform surface structure containing few if any functional groups. It is therefore particularly suitable for use in gas and liquid chromatography and as a catalyst support. Because suitable template materials, and in particular silica gels and porous glasses, are obtainable with mean pore sizes of from 3 to 2000 nm and with surface areas of from about 400 to about 1 m²g⁻¹, the method of the invention provides a way to produce porous carbon products with similar geometrical properties.

It should, however, be understood that because, in general, there will be a difference in density between the carbon product and the template material (the carbon being less dense than template materials such as silica and glass), and there will also usually be a difference between the structure volumes of the template and product, respectively, the surface area of the product per unit weight will usually differ from that of the template material. Thus the method will usually result in a product of larger surface area, per unit weight, than that of the template material upon which it is constructed.

Porous carbon products constructed upon template materials of high surface area (e.g. having a surface area of from about 50 to about 400 m²g⁻¹) are likely to be useful is reversed phase liquid chromatography and to have retentive properties similar to those of hydrocarbon-bonded silica gels; they are also likely to be useful as non-polar adsorbents in gas chromatography. Porous carbon products made from template materials of lower surface area (say less than about 100 m²g⁻¹) are likely to be useful in exclusion chromatography for the separation of polymers.

The method of the invention can produce porous carbon products in various physical forms such as random chips or spheres, by use of appropriate template materials. For use in high performance liquid chromatography the preferred particle size is in the range 5 to 20 μm. For use in gas chromatography the preferred particle size is 50-200 μm, and for use as a catalyst support the preferred particle size is 0.2 to 5 mm.

The mechanical strength of the porous carbon products of the method of the invention can be enhanced by increasing the thickness of the carbon deposit while still in the pores of the template material (e.g. by repeating a carbon-deposition treatment) or by depositing a further layer of carbon in the pores of the porous carbon product after the supporting template material has been removed.

THE DRAWINGS

FIG. 1 shows adsorption isotherms of some porous carbon products at various temperatures; and FIG. 2 shows chromatograms obtained in liquid chromatography using the porous carbon product of the invention.

DESCRIPTION OF EMBODIMENTS

EXAMPLE 1

Figure 1:
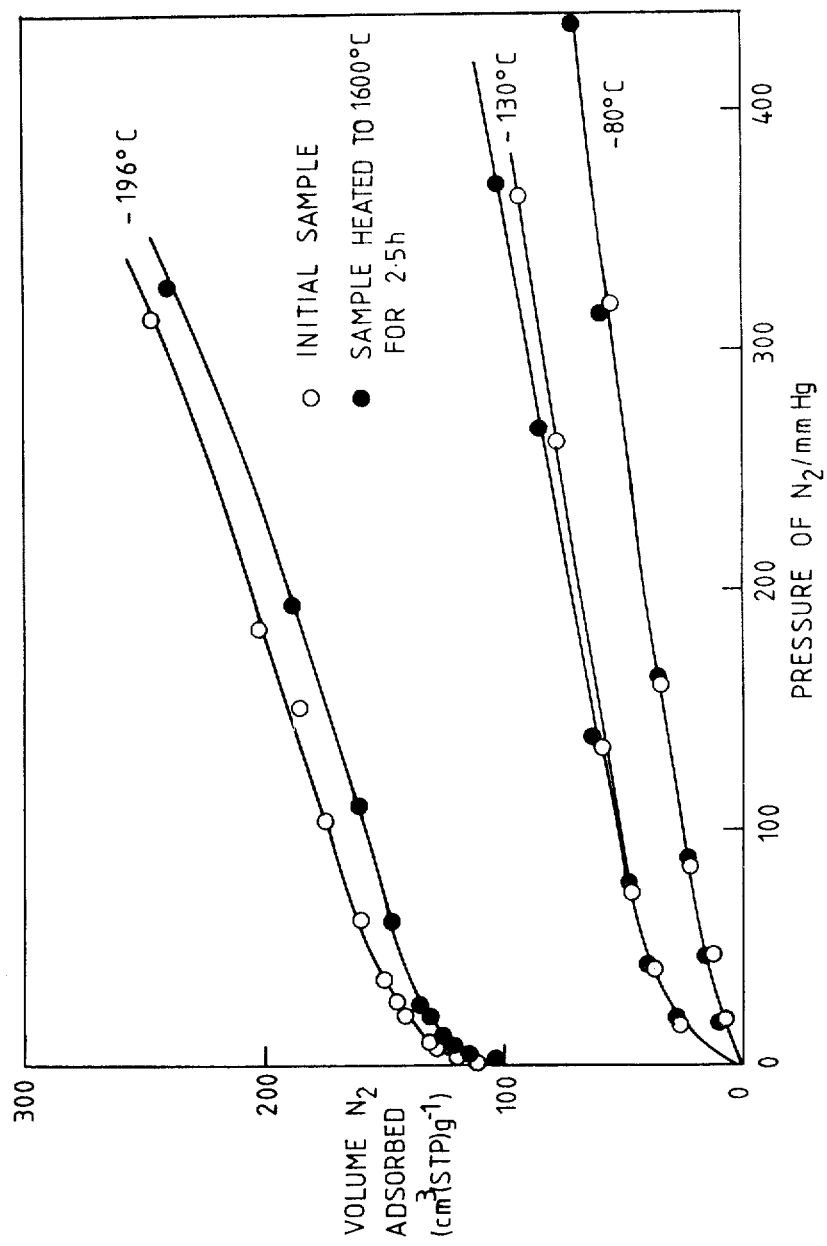

20 g. of a 40-53 μm sample of "Porasil BX 250X", a commercially produced spherical silica gel having a mean pore diameter of 15 nm and a calculated pore volume of 0.75 cm³g⁻¹ (particle porosity ≈65%), (the template material) is heated to 150° C. under vacuum for 5 hours to remove adsorbed water. The dried template material is mixed at 60° C. with 15 g. of a 10:1 molar mixture of phenol and hexamine, a polymerizable organic material. The template material adsorbs the organic material into its pore space to give a free flowing powder. This powder is heated to 110° C. for 2 hours whereupon a linear polymer, thought to have the structure

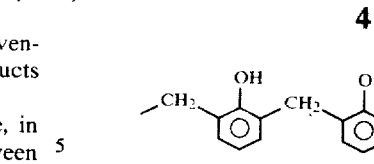

is formed. The resulting composite material is pale yellow. On further heating to 160° for 16 hours crosslinking of the polymer occurs to give a polymer thought to have the structure

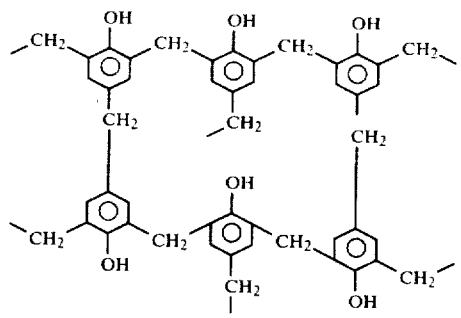

The composite material at this stage is yellow-brown in colour. On further heating to 350° C. and subsequently to 900° C. in a stream of oxygen-free nitrogen for 16 hours, pyrolysis of the organic material to carbon occurs, resulting in a completely black composite material. After cooling under nitrogen the composite material is treated with 4 M sodium hydroxide solution at 60° C. for 1 hour to dissolve the silica framework of the template material. The porous carbon product remaining floats on water and on drying is a free flowing powder.

Some physical properties of the black (pyrolysed) composite material and of the carbon product obtained therefrom are given in the Table.

The particles of the carbon product have the same general shape as the original template material, that is they are roughly spherical. However, optical and scanning electron microscopy both show that the majority of the particles are deeply cracked and fissured and they are fairly fragile. This is largely owing to the very high porosity of the material (about 90%). Under high resolution scanning electron microscopy the porous carbon product shows a structure very similar to that of the original template material.

Two methods can be used to increase the structural strength of this porous carbon product. (A) Before dissolving out the silica from the black composite material, the composite material is again impregnated with the organic material and the polymerization and pyrolysis steps are repeated. In this way the carbon content of the composite material is increased from about 20% of the pore volume to 35% of the pore volume as calculated from the data in the Table. (B) The porous carbon product is treated at 900° C. with benzene vapour in an atmosphere of nitrogen so as to deposit pyrocarbon on the internal surface of the porous carbon product.

EXAMPLE 2

A resole is prepared by the following steps: a mixture of 11.7 g of phenol (0.125 mol), 20 m³ of 37% aqueous formaldehyde solution (0.25 mol) and 74 cm³ of 20% aqueous tetraethylammonium hydroxide solution (0.1 mol) is stirred for 21 hours at room temperature and subsequently 1 hour at 100° C.; the pH is adjusted to 7 by addition of glacial acetic acid; 125 cm³ of acetone is added and the product dried by addition of anhydrous sodium sulphate; after filtration the acetone is removed from the filtrate by evaporation to give an amber oil (the resole). 3.6 cm³ of the resole is added to 5.0 g of the "Porasil BX 250X" silica gel used as template material in Example 1 to give a dry free flowing powder. This powder is placed in a quartz vessel and heated in a stream of nitrogen successively to 160° C. (16 hours), 370° C. (48 hours) and finally 900° C. (16 hours) before cooling to room temperature. The silica of the template material is removed from this composite material by digesting with 4 M sodium hydroxide for 16 hours to give, after washing and drying, a porous carbon product.

Some properties of this porous carbon product and of the composite material from which it was obtained, are given in the Table.

It may be convenient to subject the porous carbon product to heat treatment in an inert atmosphere in order to improve its chromatographic properties. The porous carbon product may, for example, be heated under nitrogen to 1600° C. for 2.5 hours.

Properties of such heat-treated product are given in the Table.

high pressure reciprocating pump. The column is connected at its outlet end to an ultraviolet photometer which acts as detector of eluted solutes. 1 microliter of a sample containing acetone and toluene is injected into the column by means of a microsyringe through an elastomer septum mounted in an injector unit attached to the inlet end of the column. The output signal from the detector is passed to a potentiometric recorder; the resulting chromatogram is shown in FIG. 2A. The two peaks correspond to the elution of acetone and toluene respectively. It is seen that the acetone is unretained by the porous carbon column packing while toluene is retained with a column capacity ratio of about 0.9. FIG. 2B shows the chromatogram which is obtained from a sample containing acetone and mesitylene.

Using formulae well known in chromatography the reduced velocity for the elution is calculated to be about 150, and the reduced plate heights for acetone, toluene and mesitylene are calculated to be about 12, 30 and 30 respectively. It is also noted that the peaks for the retained solutes toluene and mesitylene are significantly asymmetric while those for acetone are symmetrical.

From the data presented in the Examples the following conclusions may be drawn.

1. The porosity of the porous carbon product is very

TABLE

|  | EXAMPLE 1 | | EXAMPLE 2 | |
|---|---|---|---|---|
| Template Material ("Porasil BX 250") | | | | |
| Specific Pore Vol. | 0.75cm³g⁻¹ | | 0.75cm³g⁻¹ | |
| Particle Porosity | 63% | | 63% | |
| Surface area[1] | 100m²g⁻¹ | | 100m²g⁻¹ | |
| Composite Material | Impregnation | | | |
|  | Single | Double | Single | |
| Wt. % carbon | 16.6 | 25.3 | 14.3 | |
| Wt. ratio C/SiO₂ | 0.200 | 0.340 | 0.167 | |
| Vol. C/Wt. SiO₂[2] | 0.135cm³g⁻¹ | 0.230cm³g⁻¹ | 0.114cm³g⁻¹ | |
| % original pore vol. occupied by carbon | 18% | 31% | 15% | |
| Porous Carbon Product |  |  |  | After heat treatment at 1600° C. |
| Wt. % carbon | 93.7 | 82.4[4] | 92.1 | 95.7 |
| Surface area (calculated)[3] | 500m²g⁻¹ | 300m²g⁻¹ | 600m²g⁻¹ | 600m²g⁻¹ |
| Surface area (measured)[1] | — | 525m²g⁻¹ | 664m²g⁻¹ | 563m²g⁻¹ |
| Particle Porosity | 89% 81% | 90% | 90% | |

[1]Surface areas measured by the BET method using nitrogen adsorption at −196° C. [2]Assuming a density of carbon structure of 1.47g cm⁻³.
[3]Calculated from weight % carbon of composite material assuming exact replication of the original surface of the template material.
[4]The relatively low value indicates the presence of undissolved silica and suggests that a digestion time of more than 1 hour is required. Part of the measured surface area probably arises from the residual silica.

The isotherms for adsorption of nitrogen by the initial porous carbon product of Example 2 and for the heat-treated product are shown in FIG. 1 for three temperatures: −78° C., −130° C. and −196° C. The isotherm for −196° C. shows a very steeply rising portion at very low partial pressures in contrast to the isotherm which is obtained at the same temperature for the template material.

EXAMPLE 3

A liquid chromatographic column 250 mm in length, 5 mm in bore, is packed with the porous carbon product of Example 1. The column is supplied with eluent consisting of a mixture of 92 parts by volume of Chloroform and 8 parts by volume of Methanol by means of a high and this results in fragility of the particles. This can be countered either by successive impregnations or by treating the final porous carbon product with a pyrolysable vapour so as to deposit further carbon upon the material.

2. The surface of the porous product, especially after heat treatment, is close to that calculated on the assumption that the surface of the carbon is a perfect replica of the surface of the original template material. This provides strong evidence that the method of the Examples provides the material of the invention and that the final material does not contain a significant proportion of very fine pores.

3. The adsorption isotherms of the initial porous carbon product of Example 2 and of that product after heating to 1600° C. for 2.5 hours are almost identical. There is only a small loss of surface area. This again indicates an absence of very fine pores in the initial porous carbon product and confirms that the surface of the porous carbon is a genuine replica of that of the template material. 4. The isotherm for nitrogen adsorption at −196° C. shows very strong adsorption at very low partial pressure of nitrogen. A corresponding degree of adsorption with the template material occurs at a much higher partial pressure. This may indicate surface heterogeneity which can only be removed by heating to higher temperatures than 1600° C. Evidence for surface heterogeneity of the initial porous carbon product also comes from the asymmetric shape of the peaks obtained in liquid chromatography of the retained solutes toluene and mesitylene by the procedure described in Example 3.

We claim:

1. A method of producing porous carbon, comprising depositing carbon in the pores of a porous inorganic template material having a surface area of at least 1 $m^2g^{-1}$ and thereafter removing the template material to leave a porous carbon product having a geometry corresponding to that of the template material.

2. The method of claim 1, in which said template material is selected from silica gel, porous glass and porous alumina.

3. The method of claim 2, in which said template material has a mean pore size in the range 3 to 2000 nm.

4. The method of claim 3, in which said template material has a porosity of at least 40%.

5. The method of claim 1, 2, 3 or 4, comprising contacting the template material with a polymerizable organic material that enters the pores of the template material, polymerizing said polymerizable organic material within said pores, and thereafter decomposing said polymerizable material to deposit carbon in said pores.

6. The method of claim 5, in which said polymerizable organic material is a liquid having molecules sufficiently small to enter the pores of the template material.

7. The method of claim 6, in which the said polymerizable organic material is a mixture of phenol and hexamine.

8. The method of claim 6, in which the said polymerizable organic material is a phenol-formaldehyde resole.

9. The method of claim 5, comprising contacting said template material with a solution of said polymerizable organic material and causing said solution to be absorbed into said pores, and thereafter eliminating the solvent of the absorbed solution by evaporation.

10. The method of claim 1, in which the template material is removed by dissolution.

11. The method of claim 5, in which the template material is removed by dissolution.

12. The method of claim 6, in which the template material is removed by dissolution.

13. The method of claim 1, in which the template material is removed by evaporation.

14. The method of claim 1, in which the porous carbon product is modified by after-treatment comprising depositing a layer of pyrocarbon on the internal surfaces of the porous carbon product.

15. The method of claim 5, in which the porous carbon product is modified by after-treatment comprising depositing a layer of pyrocarbon on the internal surfaces of the porous carbon product.

16. The method of claim 1, in which the porous carbon product is modified by after-treatment comprising heating the porous carbon product in an inert atmosphere at a temperature suitable to cause surface reorganization or graphitization of the carbon.

17. The method of claim 5, in which the porous carbon product is modified by after-treatment comprising heating the porous carbon product in an inert atmosphere at a temperature suitable to cause surface reorganization or graphitization of the carbon.

* * * * *